United States Patent [19]
Priefert

[11] 4,062,454
[45] Dec. 13, 1977

[54] MATERIAL LOADING TRAILER APPARATUS

[76] Inventor: Marvin J. Priefert, Pittsburg Highway, Mount Pleasant, Tex. 75455

[21] Appl. No.: 773,483

[22] Filed: Mar. 2, 1977

[51] Int. Cl.² ............................................. B60P 1/04
[52] U.S. Cl. ............................. 214/1 HH; 214/358; 214/131 R
[58] Field of Search ............... 214/352, 353, 354, 355, 214/356, 357, 358, 359, DIG. 4, 1 HH

[56] References Cited
U.S. PATENT DOCUMENTS

| | | | |
|---|---|---|---|
| 999,227 | 8/1911 | Johnson | 214/358 |
| 1,423,887 | 7/1922 | Stewart | 214/359 X |
| 4,023,693 | 5/1977 | Priefert | 214/354 |

*Primary Examiner*—Albert J. Makay
*Attorney, Agent, or Firm*—Rudolph L. Lowell

[57] ABSTRACT

The loading apparatus of this invention is capable of handling heavy loads such as large round bales of hay weighing fifteen hundred pounds or more without requiring the use of hydraulic, electrical or any other auxiliary power source. The apparatus includes a ground wheel supported portable frame having a tongue structure connectible to a tractor and with the portable frame by a lost motion means. A load carrying frame is movably supported on the portable frame for movement between a lowered bale loading position and an elevated bale transport position in response to the lost motion of the tongue structure relative to the portable frame. With the load carrying frame in its loading position and the tractor advanced, a pair of lift members on the load carrying frame are moved into engagement with the ground wheels for movement forwardly and upwardly thereon to lift the load carrying frame to its transport position. Means are provided for disengaging the lift members from the ground wheels as the load carrying frame approaches its transport position wherein it is automatically and releasably locked against movement to the loading position.

16 Claims, 20 Drawing Figures

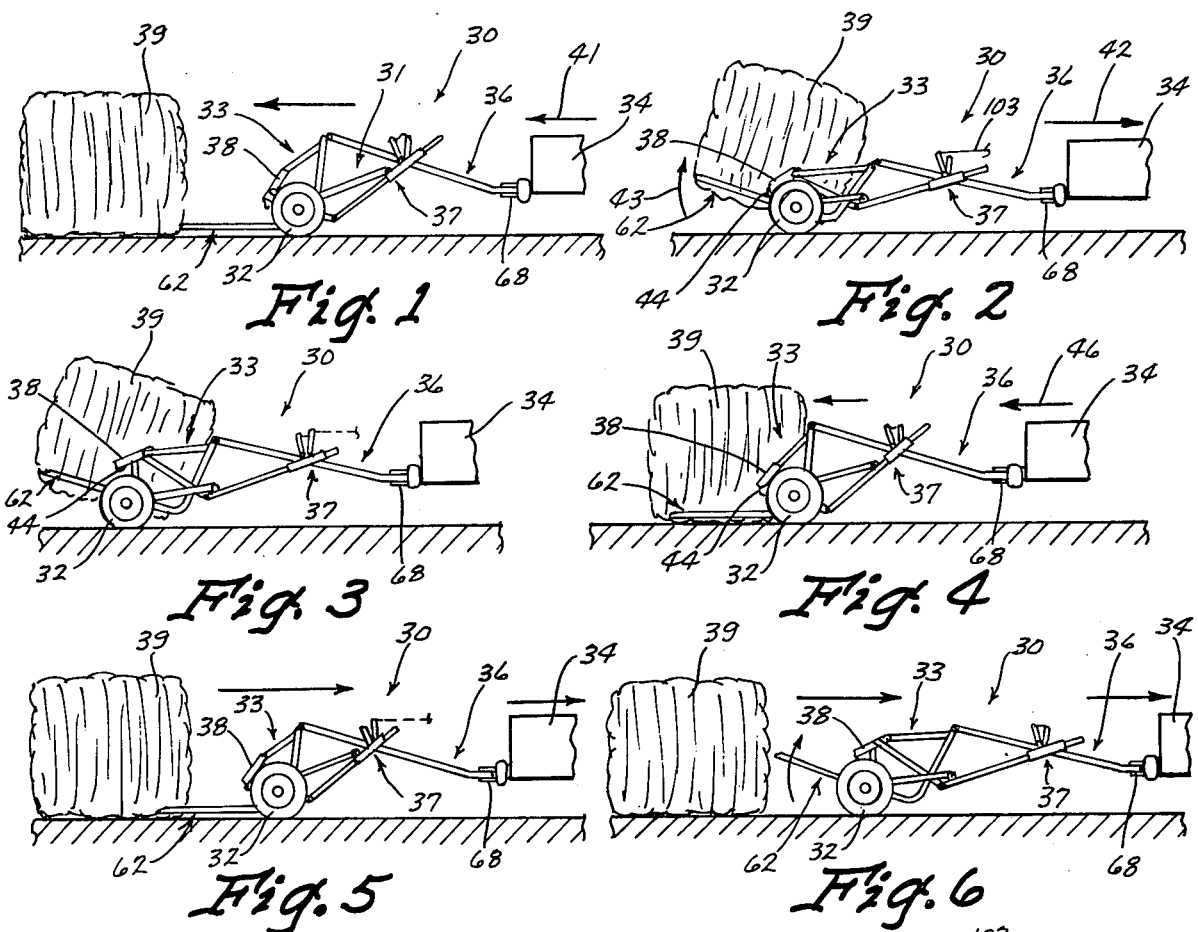
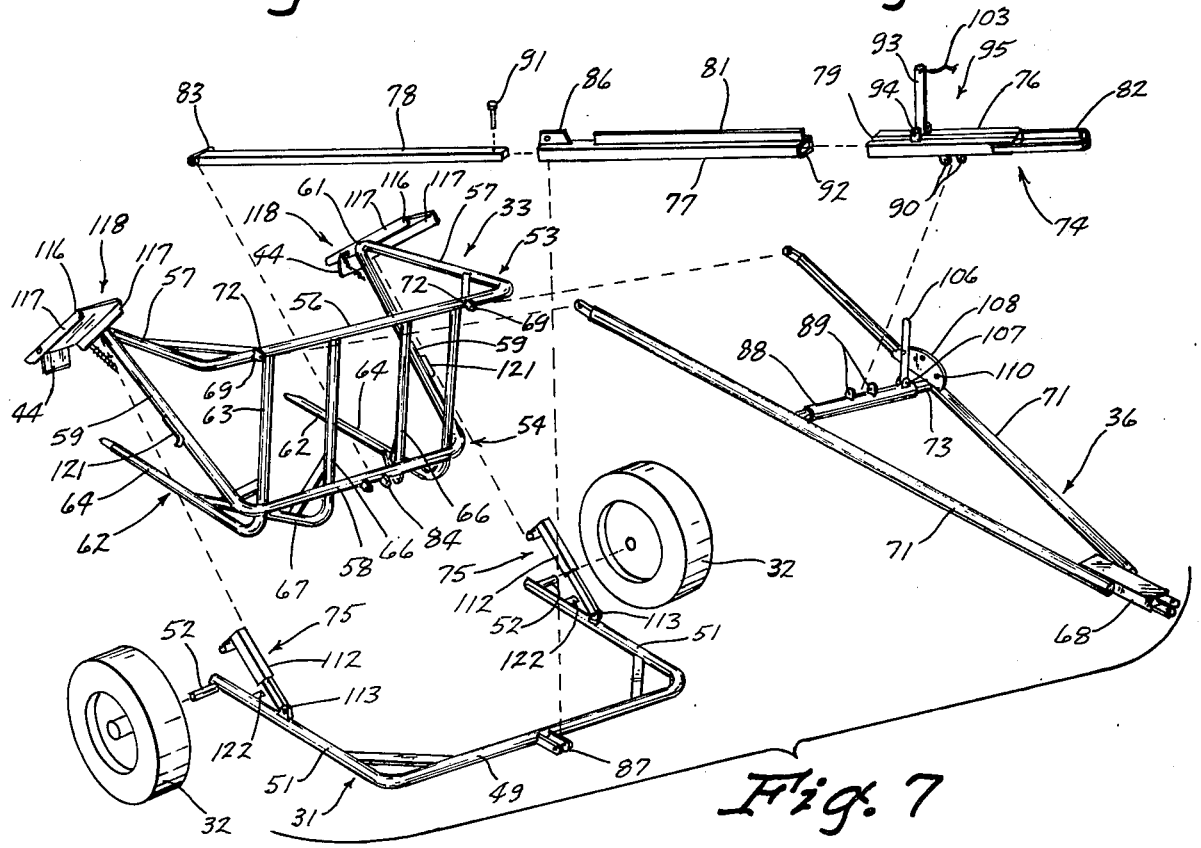

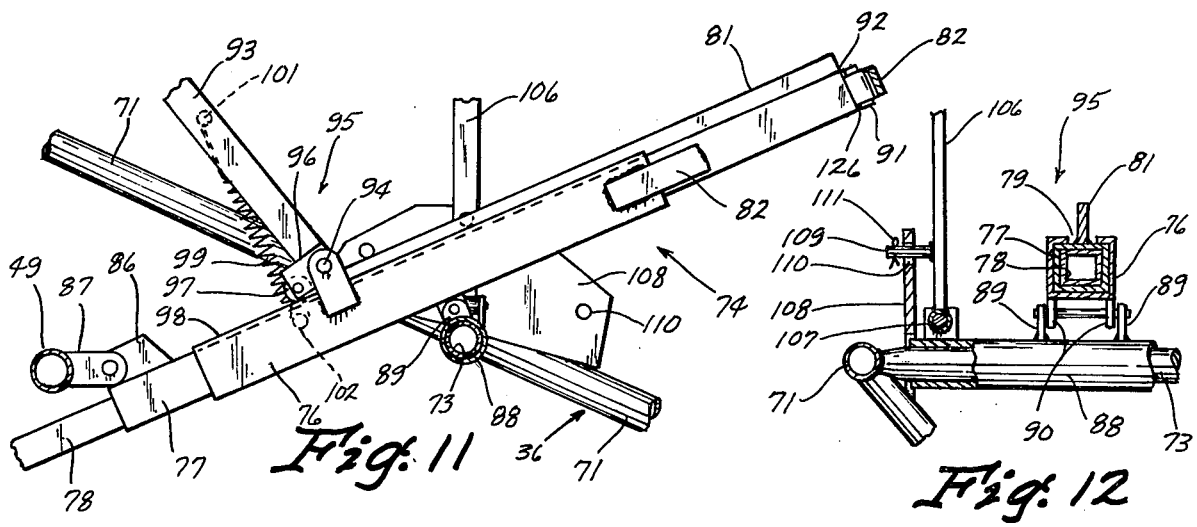
Fig. 11
Fig. 12
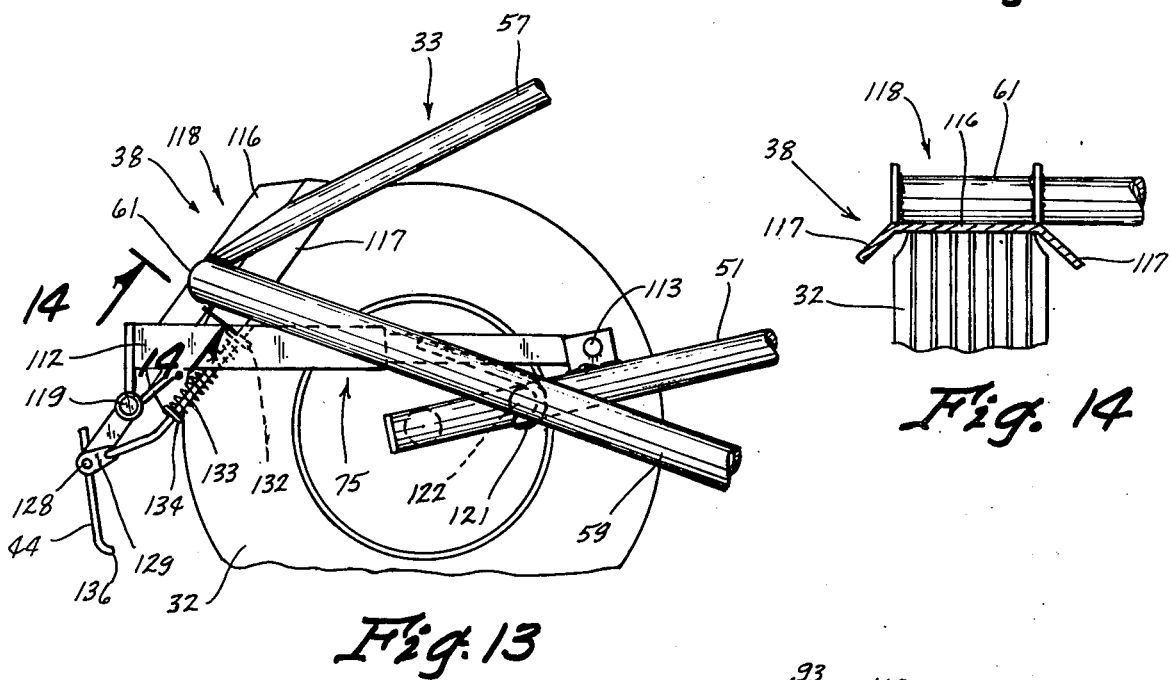
Fig. 13
Fig. 14
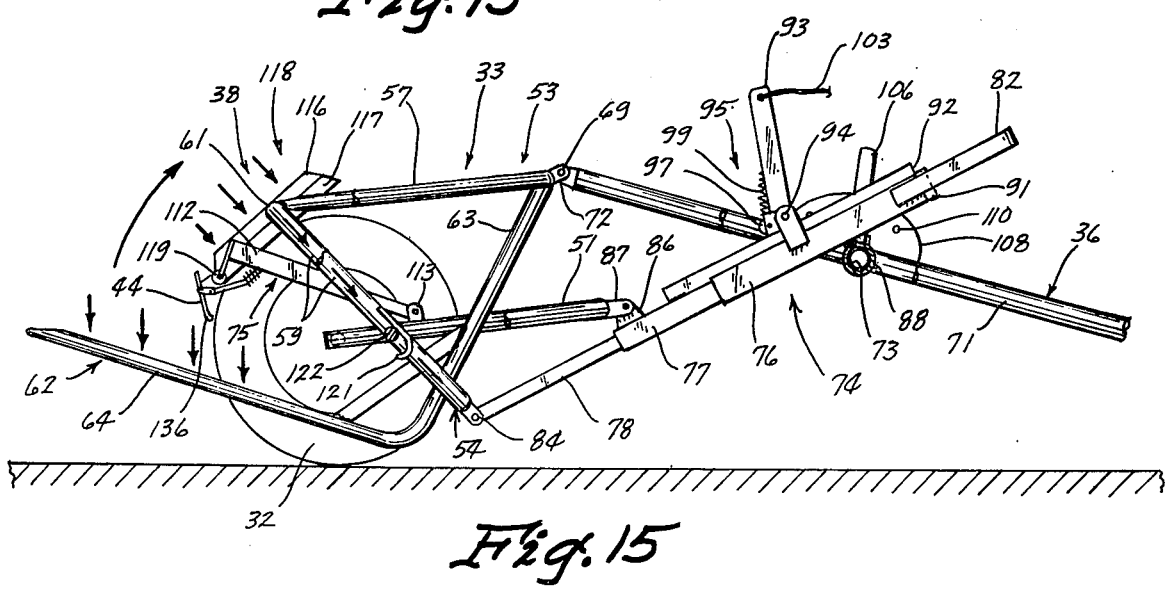
Fig. 15

U.S. Patent  Dec. 13, 1977  Sheet 4 of 4  4,062,454
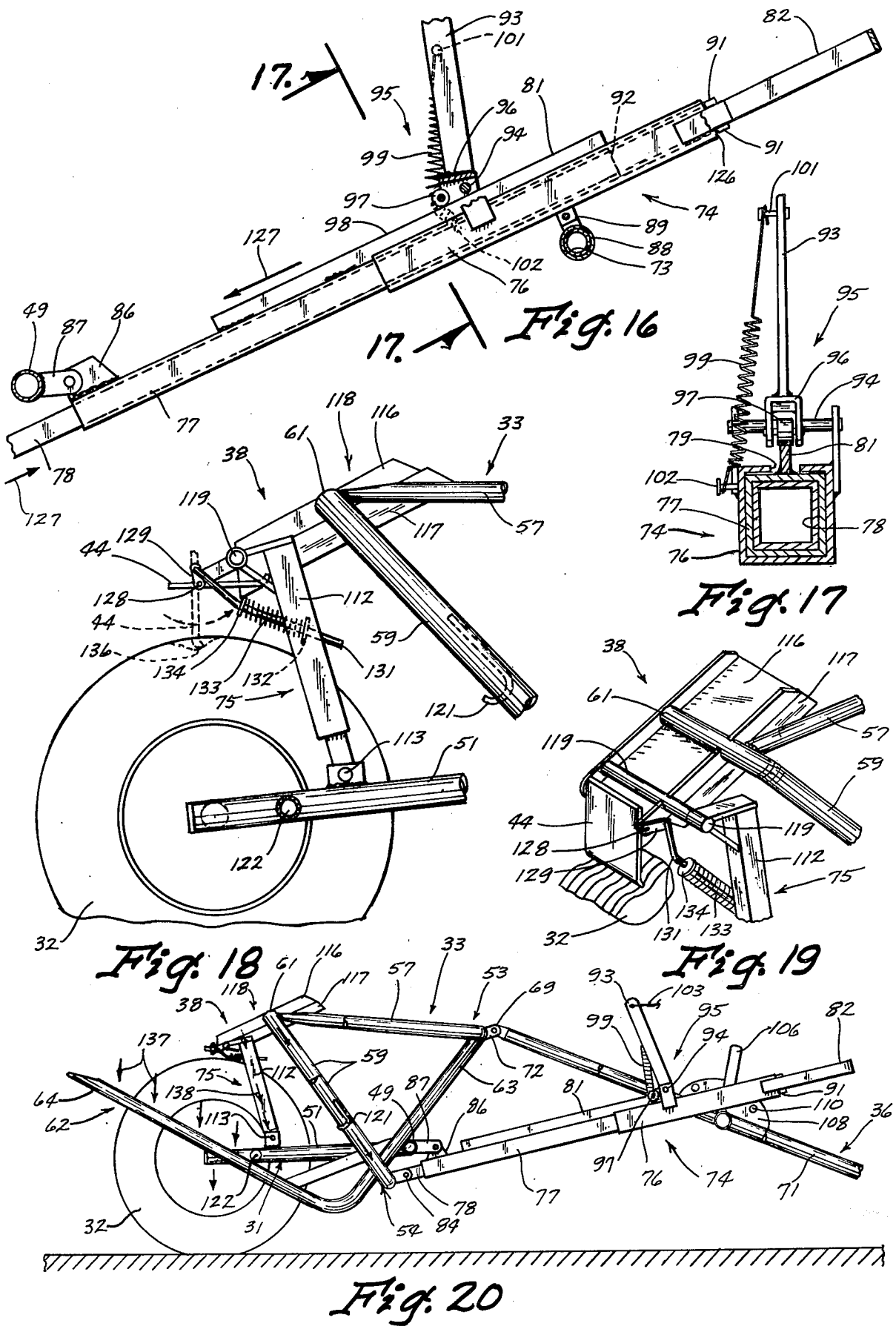

MATERIAL LOADING TRAILER APPARATUS

SUMMARY OF THE INVENTION

The loading apparatus of this invention is of a compact and rugged construction and efficient in operation to load, transport and unload a heavy object or container in response to rearward and forward movements of the towing vehicle. To elevate the load carrying frame to its transport position, a lost motion connection between the tongue structure and portable frame provides for a forward movement of the load carrying frame relative to the portable frame whereby lift members on the load carrying frame are ridably engageable with the apparatus ground wheels for movement forwardly and upwardly on the wheels to elevate the load carrying frame to the transport position therefore. As the load carrying frame approaches the transport position, pivoted kick members on the lift members are engaged by the ground wheels to elevate or kick the lift members out of engagement with the ground wheels. With the load carrying frame in its transport position, the pivoted kick members are automatically tripped forwardly out of engagement with the ground wheels. To lower the load carrying frame from the transport position to the loading position, it is only necessary to drive the towing vehicle in reverse to reengage the lift members with the ground wheels so that the load carrying frame can ride back down on the ground wheels to its lowered loading position.

Since the loading apparatus requires no special electrical or hydraulic auxiliary power source for the handling of heavy loads, an automobile or pickup truck is as suitable as the usual farm tractor for towing and operating the apparatus. In addition, the absence of any separate power hookup to a tractor vehicle provides for the quick and easy attachment and removal of the apparatus from a tractor vehicle. In use, the apparatus is easily operated from the driver's seat of the towing vehicle without special skill since the load carrying frame is automatically and releasably locked in its loading and transport positions in response to movements of the tractor vehicle. An operator need only release the locking means and then drive the tractor vehicle forwardly or rearwardly to load, transport and unload an object.

BRIEF DESCRIPTION OF THE DRAWINGS

FIG. 1 is a diagrammatic illustration of the apparatus of this invention showing the load carrying frame in a lowered position to receive a bale;

FIG. 2 diagrammatically illustrates the loaded bale carrying frame approaching the transport position therefor;

FIG. 3 is a diagrammatic illustration showing the load carrying frame in a locked bale transport position;

FIG. 4 is a diagrammatic illustration showing the load carrying frame in the lowered position therefor prior to unloading a bale;

FIG. 5 is illustrated similarly to FIG. 4 and shows the apparatus advanced forwardly from its position in FIG. 4 to unload a bale from the load carrying frame;

FIG. 6 is illustrated similarly to FIG. 3 and shows the empty load carrying frame returned to the elevated transport position therefor;

FIG. 7 is an exploded perspective view of the loader apparatus of this invention;

FIG. 11 is a detail partially sectional view on line 11—11 in FIG. 10 showing a manually actuated locking means for the lost motion connection in the locked position therefor corresponding to the loading position of the load carrying frame;

FIG. 12 is a sectional detail view as seen on line 12—12 in FIG. 10 showing the mechanism for adjusting the tongue structure to an upright position corresponding to the loading position of the load carrying frame;

FIG. 13 is an enlarged detail view showing a lift member of the load carrying frame in engagement with a ground wheel;

FIG. 14 is a detail view of the lift member as seen on line 14—14 in FIG. 13;

FIG. 15 is a side elevational view showing the load carrying frame moved to a partially elevated position relative to its showing in FIG. 8;

FIG. 16 is an enlarged detail view, illustrated similarly to FIG. 11, showing the manually actuated locking means of the lost motion connection in a released position;

FIG. 17 is an enlarged sectional detail view of the locking means as seen on line 17—17 in FIG. 16;

FIG. 18 is an enlarged detail side elevational view of the pivoted kick member shown in full lines in the released position therefor;

FIG. 19 is an enlarged detail perspective view showing the pivoted kick member in the wheel engaged position therefor; and FIG. 20 is a side elevational view of the loader apparatus showing the load carrying frame locked in the transport position therefor.

DETAILED DESCRIPTION OF THE INVENTION

Figure 8:
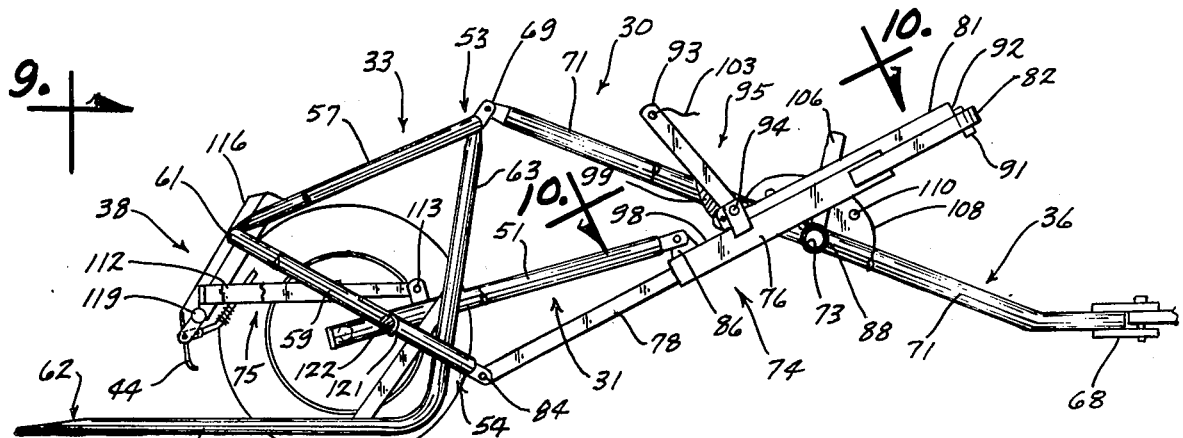
FIG. 8 is a side elevational view of the apparatus showing the parts thereof in their relative positions of FIG. 1 to load a bale on the load carrying frame.
Figure 9:
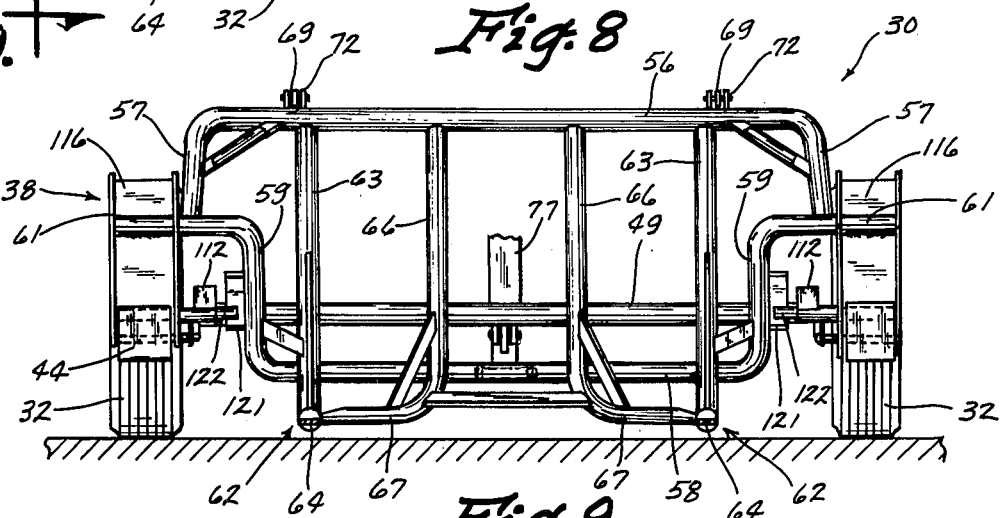
FIG. 9 is a rear elevational view of the apparatus as seen on line 9—9 in FIG. 8.

The material loading trailer apparatus of this invention is capable of loading, transporting and unloading large round bales or other loads in response to forward and reverse travel movements of a towing vehicle without requiring the use of a hydraulic, electrical or any other auxiliary power source. Referring to FIGS. 1–6, inclusive, the apparatus is diagrammatically illustrated in various positions showing the handling of a large round bale by manipulation of the towing vehicle.

The apparatus, indicated generally at 30 in FIG. 1, is comprised of a portable frame 31 that is equipped with a pair of ground wheels 32 and a separate load carrying frame 33 movably supported thereon. The load carrying frame 33 is connected to a towing vehicle 34 by means of a tongue structure 36 which is also connected to the portable frame 31 by a lost motion connection indicated generally at 37. The load carrying frame 33 has a pair of lift members 38 which are ridable forwardly and upwardly on the ground wheels 32 to raise the load carrying frame from a lowered bale loading position to an elevated bale transport position. Similarly the lift members 38 ride down on the rearwardly rotating ground wheels 32 to lower the load carrying frame 33 to its loading position.

In FIG. 1, the load carrying frame 33 is shown in a bale loading position with the lift members 38 disengaged from the ground wheels 32. A bale 39 to be handled is loaded by operating the towing vehicle 34 in reverse, as indicated by arrows 41 to move the load carrying frame 33 under the ground supported bale 39. With the bale 39 on the load carrying frame 33, a forward movement of the towing vehicle 34, as indicated by arrow 42 in FIG. 2, advances the load carrying frame to move the lift members 38 against the ground wheels 32. On a further movement of the towing vehicle 34, lift members 38 ride forwardly and upwardly on the ground wheels to elevate the bale 39 as indicated by arrow 43 in FIG. 2. As the load carrying frame 33 approaches an elevated transport position, a pivoted kick member 44 (FIG. 2) on each lift member 38 engages a respective ground wheel 32 and elevates an associated lift member 39 to a position in a clearance relation with an adjacent ground wheel 32. When the load carrying frame 33 reaches the transport position (FIG. 3), the pivoted kick members 44 are flipped forwardly out of engagement with the ground wheels 32.

On transport of the bale 39 to a feeding or storage station to be unloaded, the load carrying frame 33 is released from a locked transport position so that on a rearward movement of the towing vehicle 34, as shown by the arrows 46 in FIG. 4, the lift members 38 reengage and ride the ground wheels rearwardly and downwardly to the unloading position of FIG. 4. It is to be noted that the unloading position of the apparatus in FIG. 4 is the same in all respects as the loading position therefor in FIG. 1. With the load carrying frame 33 in the unloading position, the towing vehicle 34 is advanced to pull the load carrying frame 33 forwardly from underneath the bale 39, as shown in FIG. 5, wherein the parts of the apparatus are arranged in all respects similar to their arrangement in FIGS. 1 and 4.

To elevate the empty load carrying frame 33 to the transport position therefor, the towing vehicle 34 is advanced forwardly, as shown in FIG. 6, whereby the lift members 38 again engage the ground wheels 32 to ride upwardly and forwardly thereon. The operation of the pivoted kick members 44, as the load carrying frame approaches the transport position, is in all ways similar to their operation as described in connection with FIG. 2.

Referring to FIGS. 7 and 8, the portable frame 31 is of a U-shape having forward transverse base member 49 and rearwardly extended leg members 51. A stub shaft 52 on the rear portion of each leg member 51 rotatably supports a ground wheel 32 outwardly of each leg member 51.

The load carrying frame 33 (FIG. 7) is comprised of a pair of U-shaped upper and lower frame members 53 and 54, respectively. The upper frame member 53 has a forward transverse cross or base member 56 and rearwardly extended legs 57. The lower frame member 54 is located between the legs 51 of the portable frame 31 and includes a forward cross or base member 58 and legs 59 projected upwardly and rearwardly for connection with the rear ends of the legs 57 of the upper frame member 53. The legs 59 terminate in outwardly projected lateral portions 61 which extend transversely of the ground wheels 32 for a purpose to appear later.

A pair of elongated L-shaped fork members 62 are secured to the load carrying frame 33 in a parallel transversely spaced relation. Each fork member consists of a generally upright front portion 63 secured to the upper and lower cross members 56 and 58, respectively, and a lower generally rearwardly extended tine portion 64 for engaging a bale. Lateral reinforcement for the tines 64 is provided by a pair of L-shaped braces 66 secured to the cross members 56 and 58 intermediate the fork members 62 with lower portions 67 extended outwardly and rearwardly for connection to a medial portion of a respective tine 64. The tines 64 are arranged relative to the load carrying frame 32 so as to extend horizontally rearwardly in the loading position of the load carrying frame (FIG. 1) and upwardly and rearwardly in the transport position of the load carrying frame (FIG. 3).

The tongue structure 36 (FIG. 7) includes a short generally horizontally disposed clevis connector 68 for connection to a towing vehicle. A pair of elongated linkages or tongue members 71 are secured at their forward ends to the connector 68 and diverge rearwardly therefrom for pivotal connection at 69 to a pair of corresponding transversely spaced brackets 72 on the upper cross member 56 of the load carrying frame 33. The tongue structure 36 is thus supported at the bracket pivot connections 69 for up and down pivotal movement relative to the load carrying frame 33. A cross bar 73 is connected to and extended transversely between medial portions of the tongue linkages 71 for a purpose to appear later. Linkages 71 form a triangle with the upper cross member 56 to provide guided stability for the load carrying frame 33 relative to the portable frame 31.

The load carrying frame is supported on the portable frame for movement between the lowered loading position of FIG. 1 and the elevated transport position of FIG. 3 by means including a lost motion connection 74 between the tongue structure and portable frame and a lost motion connection 75 between the load carrying frame and portable frame. The lost motion connection 74 (FIG. 7) comprises an extensible and retractible three part linkage, namely, an outer guide member 76, a central sleeve member 77 slidably receivable within the guide member 76 and an elongated arm member 78 telescopically receivable within the central sleeve 77. The top of the guide member 76 is longitudinally slotted at 79 (FIG. 10) to receive an elongated upstanding flange 81 on the central sleeve member 77. The outer guide member 76 is also provided with a forwardly extended U-shape stop 82 for limiting the forward movement of the inner arm 78 relative to the sleeve 77.

Each of the linkage members of the lost motion connection 74 are independently pivotally connected to separate portions of the apparatus. Thus, a pivotal connection 83 (FIG. 7) is provided at the rear end of the inner arm 78 for pivotal connection at 84 to the lower cross member 58 of the load carrying frame 33. The central sleeve 77 is slidably movable to a position extended forwardly below the portable frame base member 49 for pivotal connection of a flange 86 to a connector 87 on the base member 49. The outer guide member 76 is slidably movable to a position extended forwardly above the cross member 73 of the tongue structure 36. A cylindrical sleeve 88, rotatably carried on the tongue cross member 73, has a pair of upstanding ears 89 pivotally interconnected with a pair of corresponding depending brackets 90 on the guide member 76. A stop pin 91 inserted through the forward end of the inner arm member 78 limits relative movement between the linkage members 76, 77 and 78 of the lost motion connection 74.

Figure 10:
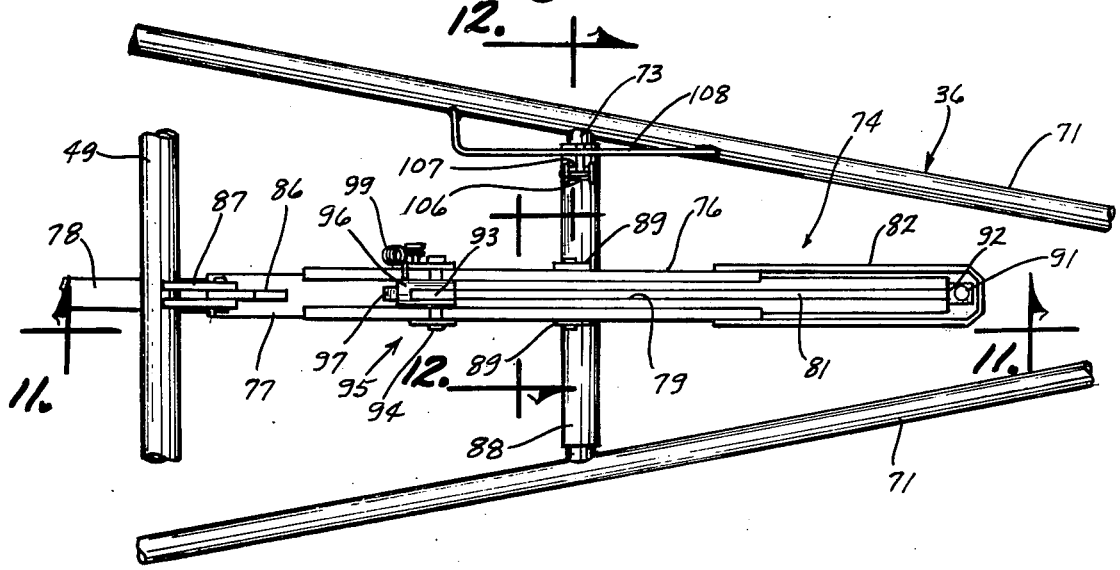
FIG. 10 is an enlarged detail plan view taken substantially along the line 10—10 in FIG. 8, showing the lost motion connection between the tongue structure and portable frame.

The linkage members of the lost motion linkage 74 are shown in FIGS. 8 and 10 releasably locked in first relative positions corresponding to the loading position of the load carrying frame 33. In this position, the outer guide member 76 is fully retracted rearwardly, the forward end of the stop 82 is engaged with the forward end of the inner arm member 78 and the central sleeve member 77 has its forward edge 92 engaged by the stop pin 91. Lock means 95 for releasably locking the linkage members 76, 77 and 78 in these first relative positions is shown best in FIG. 11 as including an upstanding trip lever 93 pivotally supported at 94 on the outer guide member 76, intermediate the ends thereof, and in a clearance relation above the flange 81 on the central sleeve member 77. A bracket 96 on the lower end of the trip lever 93 carries a roller 97 engageable with the upper surface 98 of the outer guide member 76 and the flange 81.

With the flange 81 out of engagement with the roller 97, the roller is biased downwardly against upper surface 98 of the guide member 76 by a coil spring 99 arranged in tension between a pin 101 on the trip lever 93 and a pin 102 on the guide member 76. With the roller 97 positioned rearwardly of the flange 81, as shown in FIGS. 8 and 11, it is seen that the central sleeve member 77 is confined between the roller 97 and the stop pin 91.

To release the lock means 95, the operator of the towing vehicle need only pull on a trip rope 103 (FIG. 8) connected to the upper end of the trip lever 93 to pivot the lever forwardly against the action of spring 99, thereby raising the roller 97 above the flange 81 and permitting rearward movement of the flange below the roller. When the central sleeve member 77 is initially moved relative to the guide member 76, to position the flange 81 beneath the roller 97, the trip rope 103 may be immediately released by the operator. The roller 97 will then roll freely on the upper surface of flange 81 until the linkage members 76, 77 and 78 are relatively moved to positions corresponding to either a loading position or transport position of the load carrying frame 33.

Referring to the tongue structure 36 in FIG. 7, it is seen that the cylindrical sleeve member 88 on the tongue cross bar 73 is provided with an upstanding lever 106 pivotally mounted on the sleeve at 107 for pivotal movement into and out of engagement with an upstanding segment or semi-circular plate 108 carried on a tongue member 71. The lever 106 (FIG. 12) carries a pin 109 receivable within a selected adjustment hole 110 formed in the segment 108. Pin 109 is retained in a selected hole 110 by a cotter pin 111. It is seen in FIG. 8 that adjustment of the lever 106 rotates the sleeve 88 to vary the longitudinal and vertical relationship of the tongue structure 36 relative to the lost motion connection 74. Accordingly, with the load carrying frame 33 maintained in its loading position of FIG. 8, adjustment of lever 106 is effective to vary the height of the forward end of the tongue structure 36 between adjusted vertical positions to accommodate the hitch on the towing vehicles.

The previously mentioned lost motion connection 75 (FIG. 7) between the load carrying frame 33 and portable frame 31, is comprised of a pair of extendible and retractible telescoping units 112, each of which has one end pivotally connected at 113 with an adjacent portable frame leg member 51 at a position forwardly of a ground wheel 32. The opposite end of each telescoping unit 112 is pivotally connected to the load carrying frame 33 in operative association with a lifting mechanism to be hereinafter described.

Referring to FIGS. 13 and 14, there is secured to the underside of each outwardly projecting lateral portion 61 of the lower U-shape frame member 54 an upwardly and forwardly inclined fender 116. Each fender 116 has a pair of depending flanges 117 positioned to opposite sides of a ground wheel 32 (FIG. 14) for guidable engagement with the ground wheel. For convenience, the lateral projection 61 and associated fender 116 will be hereinafter collectively referred to as a lift member 118. Since both lift members 118 are identical in construction and operation, like numerals will be used to refer to like parts.

The upper or rear end of a telescoping unit 112 (FIGS. 13 and 19) is pivotally supported on a pivot 119 extended transversely across the rear portion of a fender 116. In the lowered loading position of the load carrying frame 33, the telescoping units 112 are disposed generally horizontally and fully extended so as to provide clearance between the fenders 116 and their associated ground wheels for movement of the apparatus forwardly or rearwardly by the towing vehicle.

The lowered position of the load carrying frame 33 is defined by the engagement of coacting abutment means on the load carrying frame and portable frame which, as shown in FIGS. 8 and 13, includes a J-shaped bracket 121 on each leg 59 of the lower U-frame 54 and corresponding stub shafts 122 on the portable frame leg members 51. Each bracket 121 is hooked about a respective stub shaft 122 to provide for the tines 64 being in a clearance relation with the ground when the load carrying frame 33 is in its lowered position.

The lifting mechanism of the present invention becomes operable on release of the lock means 95 and a forward advance of the towing vehicle. The forward movement of the towing vehicle is transmitted through the tongue structure 36 directly to the upper cross member 56 of the load carrying frame 33. The initial pull on the tongue structure 36 by the towing vehicle moves the J-brackets from their hooked positions with the stub shafts 122 for slidable engagement thereon. The load carrying frame 33 is thus moved forwardly on the stub shafts 122 thereby retracting the telescoping units 112 and moving the fenders 116 into engagement with the upper rear portions of the ground wheels 32 (FIG. 13). The forward advance of the tongue structure 36 is resisted by this engagement of the fenders 116 with the ground wheels 32 which are then rotated forwardly to carry the fenders 116 forwardly and upwardly thereon as shown in FIG. 15.

The relative movement of the tongue linkage members 76, 77 and 78 during the lifting operation can be seen by a comparison of FIG. 11 and FIG. 16. The initial lifting movement of the fenders 116 on the ground wheels 32 effects a forward and downward tilting of the load carrying frame 33 and a corresponding forward movement of the guide member 76 until its forward edge 126 engages the stop pin 91 on the arm member 78 (FIG. 16). Thereafter, the guide member 76 and arm member 78 are moved in unison longitudinally of the central sleeve member 77, in the direction indicated by arrows 127 in FIG. 16. During this relative movement between the guide member 76 and central sleeve member 77, the roller 97 of the lock means 95 rides along the upper edge of the sleeve member flange 81, as shown in FIG. 17.

Referring to FIG. 13, a pivoted kick member 44 is rockably suspended from the rear portion of a fender 116 on a rock shaft 128 having a rock arm 129. A push rod 131 has one end pivotally connected to the rock arm 129 and its opposite end slidably supported in a bracket 132 mounted on a telescoping unit 112. A spring 133 is mounted in compression about the rod 131 between a stop collar 134 and the bracket 132. In the position of FIG. 13, corresponding to the lowered position of the load carrying frame 33, spring 133 is relaxed allowing the pivoted kick member 44 to hang freely.

Upon an advance of a fender 116 forwardly and upwardly on the ground wheel 32 to the position of FIG. 15, the pivoted kick member 44 swings freely to engage its lower edge 136 with the rear portion of a ground wheel 32. As a result of this engagement the kick member 44 is pivoted forwardly relative to an associated fender 116 by the forwardly rotating ground wheel 32 whereby the fender 116 is lifted to a position in a clearance relation with the ground wheel (FIGS. 18 and 19). Following this disengagement of the fender 116 from the ground wheel 32, the weight of the load carrying frame 33 is briefly supported entirely on the pivoted kick members 44 which, in turn, are supported on the ground wheels 32.

To disengage the pivoted kick members 44 from the ground wheels 32, when the load carrying frame is in a transport position, the rock arm 129 and push rod 131 associated with each pivoted kick member 44, act as an overcenter toggle mechanism to automatically kick a pivoted member 44 forwardly and upwardly away from the ground wheel from the dotted line position in FIG. 18 to the solid line position shown in the same figure. As the load carrying frame 33 is elevated from the position of FIG. 15 to that of FIG. 20, the push rod 131 slides forwardly within the bracket 132 on a telescoping unit 112, to compress and load the spring 133. As the load carrying frame reaches the transport position of FIG. 18, it will be seen that rock arm 129 forces the push rod 131 upwardly to an overcenter position with respect to the axis of the rock shaft 128. This movement triggers the expansion of the spring 133 so that the push rod 131 forces the rock arm 129 and pivoted kick member 44 therewith upwardly from the dotted line position to the full line position in FIG. 18.

As the load carrying frame 33 is elevated from the loading position of FIG. 8, through the intermediate position of FIG. 15 to the final transport position shown in FIG. 20, the telescoping units 112 are continuously retracted to their fully retracted positions shown in FIG. 20 wherein a weight on the load carrying frame, indicated by arrows 137, is applied through the lower U-shaped frame 54 and fenders 116 onto the fully retracted telescoping units 112, as indicated by arrows 138.

With the outer guide member 76 of the lost motion connection 74 moved forwardly relative to the central sleeve member 77 to a position corresponding to the transport position of the load carrying frame, as shown in FIG. 20, the roller 97 of the lock means 95 is moved forwardly of the flange 81. As a result, spring 99 biases the roller 97 downwardly and forwardly of the flange 81 thereby locking the linkage members of the lost motion connection 74 in relative positions corresponding to the transport position of the load carrying frame 33.

To return the load carrying frame to a lowered position, for unloading a bale, it is only necessary to pull the trip rope 103 forwardly and reverse the towing vehicle to effect a rearward lost motion of the tongue structure 36 relative to the portable frame 31. The rearward movement of the tongue structure 36 rocks the load carrying frame 33 rearwardly on the telescoping units 112 until the fenders 116 reengage the top portions of the ground wheels 32. A continued reversed movement of the towing vehicle forces the fenders to ride rearwardly and downwardly on the ground wheels to lower the load carrying frame 33 to its loading position.

After a bale has been unloaded, as previously described in connection with FIG. 5, the operator merely pulls forwardly on the trip rope 103 and drives the towing vehicle forwardly whereby the empty load carrying frame 33 is automatically moved to and locked in its transport position.

Although the invention has been described with respect to a preferred embodiment thereof it is to be understood that it is not to be so limited since changes and modifications can be made therein which are within the full intended scope of this invention as defined by the appended claims.

I claim:
1. A material loading trailer apparatus comprising:
 a. a portable frame,
 b. a pair of ground wheels,
 c. means suporting each ground wheel on the portable frame for rotation about an axis extended transversely of the portable frame,
 d. a load carrying frame,
 e. a tonque structure having a rear portion pivotally connected to the load carrying frame and a forward portion connectible with a towing vehicle,
 f. means for supporting the load carrying frame on the portable frame for movement between a lowered loading position and an elevated transport position including:
  1. a first lost motion means connecting the tongue structure to the portable frame for movement of the load carrying frame relative to the portable frame in response to a longitudinal lost motion of the tongue structure relative to the portable frame, and
  2. a second lost motion means connecting the load carrying frame to the portable frame for vertical and longitudinal movement of the load carrying frame relative to the portable frame,
 g. a lift member on the load carrying frame for each ground wheel,
 h. each lift member, in response to a forward lost motion of the tongue structure relative to the portable frame, being moved forwardly and upwardly on an associated ground wheel to elevate the load carrying frame from the lowered loading position to the transport position therefor, and in response to a reverse lost motion of the tongue structure relative to the portable frame to lower the load carrying frame from the transport position to the loading position therefor, and
 i. locking means for releasably securing the load carrying frame in said transport position.

2. A material loading trailer apparatus, according to claim 1, wherein:
 a. said first lost motion means comprises an extensible and retractable linkage assembly including an outer guide member, a central sleeve member movable longitudinally of said guide member and an elongated inner arm member slidably movable longitudinally within the central sleeve member, b. said outer guide member pivotally connected to a medial portion of the tongue structure, said central sleeve member pivotally connected to the portable frame and said inner arm member pivotally connected to the load carrying frame, and c. means for locking said outer guide member, central sleeve member and inner arm member in first relative positions corresponding to the loading position of the load carrying frame and in second relative positions corresponding to the elevated transport position of the load carrying frame.

3. A material loading trailer apparatus, according to claim 1, wherein:

a. said tongue structure comprises a V-shaped member having leg sections connected together at the forward ends thereof and diverging rearwardly for connection of the rear ends thereof to transversely spaced positions of the load carrying frame, and b. a cross bar connected to and extended transversely between medial portions of said leg sections, c. said first lost motion means connecting said cross bar with the portable frame.

4. A material loading trailer apparatus, according to claim 1, wherein:

a. each lift member comprises an elongated plate member connected to the load carrying frame adjacent an associated ground wheel, said plate member having a pair of depending, transversely spaced flanges arranged at opposite sides of a ground wheel for guidably receiving the ground wheel therebetween.

5. A material loading trailer apparatus, according to claim 1, including:

a. a pair of longitudinally extended fork members supported in a transversely spaced relation on said load carrying frame, said fork members extended horizontally rearwardly from the ground wheels in the loading position of the load carrying frame and projected upwardly and rearwardly in the transport position of the load carrying frame.

6. A material loading trailer apparatus, according to claim 1, including:

a. coacting stop means on the load carrying frame and portable frame, b. said coacting stop means being movable into abutting engagement to limit the downward movement of the load carrying frame to the loading position therefor.

7. A material loading trailer apparatus, according to claim 1, wherein:

a. said first lost motion means comprises an elongated sleeve segment and an elongated arm segment slidably movable longitudinally within said sleeve segment, and b. means for connecting one of said segments to the portable frame and the other of said segments to the tongue structure.

8. A material loading trailer apparatus according to claim 1, wherein:

a. said ground wheels are rotated by the lift members in response to the forward and upward movement of the lift members on the ground wheels.

9. A material loading trailer apparatus, according to claim 1, including:

a. means for adjusting the first lost motion means to limit movement of the front end of the tongue structure between vertically spaced adjusted positions determined by the lowered loading position of the load carrying frame.

10. A material loading trailer apparatus, according to claim 1, including:

a. manually actuated means for operating the releasable locking means to release the load carrying frame for movement from the elevated position to the loading position therefor.

11. A material loading trailer apparatus, according to claim 1, wherein:

a. each lift member includes a pivoted member pivotally connected at one end on the lift member for pivotal movement about a generally transverse axis, b. with the free end of said pivot member engageable with the upper portion of a respective ground wheel in response to an upward and forward movement of a lift member on a ground wheel, to provide for an upward and forward translatory movement of the pivoted end of said pivoted member whereby to elevate a lift member and move the load carrying frame toward the transport position therefor, and c. means for disengaging said free end of the pivoted member from a ground wheel when the load carrying frame is in the transport position therefor.

12. A material loading trailer apparatus, according to claim 11, wherein:

a. said means for disengaging the free end of a pivoted member from a ground wheel comprises bias means, responsive to movement of the load carrying frame toward the elevated transport position, therefor, to urge said free end forwardly and upwardly to a position in clearance relation with the ground wheel.

13. The material loading trailer apparatus, according to claim 11, wherein:

a. said second lost motion means comprises an extensible and retractable connector means having one end pivotally connected to the load carrying frame and the other end thereof pivotally connected to the portable frame, b. said connector means movable from a substantially horizontal, fully extended position corresponding to the loading position of the load carrying frame to a substantially vertical, fully retracted position corresponding to the transport position of the load carrying frame, and c. said load carrying frame, in the transport position therefor, being substantially supported on said connector means.

14. A material loading trailer apparatus, according to claim 13, wherein:

a. said means for disengaging the free end of the pivoted member from a ground wheel includes:
 1. a rock arm pivotally movable with the pivoted member about the pivot axis therefor,
 2. a push rod pivotally connected at one end to the rock arm,
 3. means for slidably supporting the opposite end of the push rod on the extensible and retractable connector means, and
 4. means for yieldably urging the push rod in the direction of said one end,
 5. said rock arm and push rod movable in said one direction to an over center position with respect to said pivot axis in response to the movement of said free end of the pivoted member on the ground wheel so that, in the transport position of the load carrying frame, said free end is urged upwardly and forwardly to a position in clearance relation with the ground wheel.

15. A material loading trailer apparatus comprising:
a. portable frame,
b. a pair of ground wheels,
c. means supporting each ground wheel on the portable frame for rotation about an axis extended transversely of the portable frame,
d. a load carrying frame,
e. a tongue structure having a rear portion connected to the load carrying frame and a forward portion connectible to a towing vehicle,
f. means for supporting the load carrying frame on the portable frame for movement between a lowered loading position and an elevated transport position including:
  1. a first lost motion means connecting the tongue structure to the portable frame for movement of the load carrying frame relative to the portable frame in response to a longitudinal lost motion of the tongue structure relative to the portable frame, and
  2. an extensible and retractable connector means having one end pivotally connected to the load carrying frame and the other end pivotally connected to the portable frame,
g. a lift member on the load carrying frame extended transversely of and situated rearwardly of each ground wheel in the lowered position of the load carrying frame,
h. each lift member, in response to a forward motion of the load carrying frame relative to the portable frame, being movable into engagement with a respective ground wheel to rotate said wheel in a forward direction by riding forwardly and upwardly thereon whereby to elevate the load carrying frame,
i. means for momentarily engaging a ground wheel in response to the upward movement of a lift member on the ground wheel to disengage the lift member from the ground wheel when the load carrying frame is in the transport position thereof, and
j. releasable lock means for automatically securing the load carrying frame in the transport position therefor.

16. A material loading trailer apparatus, according to claim 15, wherein:
a. each lift arm comprises an elongated plate-like fender member, and
b. said means for disengaging a lift member from a ground wheel comprises a pivoted member pivotally suspended from a rear portion of a fender member and only engageable with a ground wheel as the load carrying frame approaches the transport position thereof.

* * * * *